US007789241B2

(12) United States Patent
Boom Coburn et al.

(10) Patent No.: US 7,789,241 B2
(45) Date of Patent: Sep. 7, 2010

(54) ERGONOMIC SUBSTRATE CONTAINER

(75) Inventors: Melissa Boom Coburn, Eden Prairie, MN (US); Jeffrey Lewin, Minnetonka, MN (US); Ken Spaeth, River Falls, WI (US); Tom Woehrman, River Falls, WI (US); Shari LaPorte, Brooklyn Park, MN (US); R. Steven Griffin, Prior Lake, MN (US); John Stasieluk, St. Paul, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 1715 days.

(21) Appl. No.: 10/274,909

(22) Filed: Oct. 21, 2002

(65) Prior Publication Data

US 2003/0173247 A1 Sep. 18, 2003

Related U.S. Application Data

(60) Provisional application No. 60/363,872, filed on Mar. 12, 2002.

(51) Int. Cl.
*B65D 85/86* (2006.01)
(52) U.S. Cl. ........................... 206/719; 206/303
(58) Field of Classification Search ................ 206/719, 206/709, 454, 711, 308.3, 308.1, 303; 211/41.18, 211/40, 41
See application file for complete search history.

(56) References Cited

U.S. PATENT DOCUMENTS

| 3,460,552 | A | * | 8/1969 | Sturgeon | 134/135 |
|---|---|---|---|---|---|
| 3,675,620 | A | * | 7/1972 | Baustin | 206/538 |
| 4,731,903 | A | * | 3/1988 | Kennedy et al. | 16/224 |
| 4,966,284 | A | * | 10/1990 | Gregerson et al. | 206/711 |
| 5,123,681 | A | * | 6/1992 | Kos et al. | 292/87 |
| 5,383,550 | A | * | 1/1995 | Tsao | 206/5.1 |
| 5,476,176 | A | | 12/1995 | Gregerson et al. | 206/711 |
| 5,657,506 | A | * | 8/1997 | Pankow | 15/104.92 |
| 5,803,269 | A | | 9/1998 | Jacoby et al. | 206/592 |
| 5,842,575 | A | | 12/1998 | Dressen et al. | 206/711 |

(Continued)

OTHER PUBLICATIONS

CVD Data Storage Bulletin, Dan Woods, R&D Manager and Senior Member Technical Staff, Texas Instruments, "Improved Disk Drives Through the Computational Power of DSP," Sep. 2000, pp. 15-21.

*Primary Examiner*—Gene Kim
*Assistant Examiner*—Urszula M Cegielnik
(74) *Attorney, Agent, or Firm*—Jennifer M. Buenzow

(57) ABSTRACT

A substrate transport container is provided. Substrate transport container includes a container and a cover. The container includes an open top portion and a closed bottom portion, each having a perimeter greater than the middle portion of the container. The cover further includes a carrier, which is used for transporting information pertaining to the substrate. The interior of the container includes insert members. The insert includes outer and inner guide rails, compound slanted guides, recessed buttons and catch knobs. The rails are open at the top to provide an easy guide when placing the substrate in the container. The rails then narrow, and along with the compound slanted guides, provide a design that securely holds the substrate in place. The insert is angled such that the outer rim of the substrate will only contact the insert. The insert and container are formed together through a two shot or over molding process.

34 Claims, 10 Drawing Sheets

U.S. PATENT DOCUMENTS

| | | | |
|---|---|---|---|
| 5,881,878 A * | 3/1999 | Faccioli et al. | 206/438 |
| 5,921,397 A | 7/1999 | Whalen et al | 206/711 |
| 5,996,785 A * | 12/1999 | Palmer et al. | 206/308.1 |
| 6,000,550 A | 12/1999 | Simpson et al. | 206/711 |
| 6,073,764 A * | 6/2000 | Haas et al. | 206/308.1 |
| 6,196,384 B1 * | 3/2001 | Belden, Jr. | 206/308.1 |
| 6,366,260 B1 * | 4/2002 | Carrender | 343/866 |
| 6,454,091 B1 * | 9/2002 | Mendoza et al. | 206/308.1 |
| D464,879 S * | 10/2002 | Meeker et al. | D9/424 |
| 6,644,488 B1 * | 11/2003 | Coleman | 220/23.4 |
| 6,923,325 B2 * | 8/2005 | Duban-Hu et al. | 206/711 |
| 2002/0153275 A1 * | 10/2002 | Ryals | 206/523 |

* cited by examiner

ERGONOMIC SUBSTRATE CONTAINER

CROSS-REFERENCE TO RELATED APPLICATION

The present application is based on and claims the benefit of U.S. provisional patent application Ser. No. 60/363,872, filed Mar. 12, 2002, the content of which is hereby incorporated by reference in its entirety.

FIELD OF THE INVENTION

The present invention relates generally to a container which allows for secure containment and transport of substrates. More particularly, the present invention relates to a device designed to securely contain and transport substrates, and addressing ergonomic issues related to the use of such containment devices.

BACKGROUND OF THE INVENTION

Various containers have been used in the disc drive industry to carry and transport discs or substrates. These containers provide the vital function of keeping the substrate free from various contaminants, vibration, shock and scratching in order to secure and protect the information imbedded in the substrate.

One aspect of the containers created to carry and transport substrates is the design of such containers. Substrate containers needed to be designed to provide stable balance when the container is in the open or closed position so that the container is not easily tipped over, which would damage or contaminate the substrate. Therefore, there is a need for a substrate container designed to provide stability in both the open and closed position.

Substrate containers may also be designed to address ergonomic-related issues. Grip style, grip width, reduced moment and weight, and the stackability of the container all effect ergonomics. Other design features may include providing rounded edges on the substrate container, guide rails within the container for ease of loading substrates, an easy to open latch on the container, and easily identifiable labeling on the outer surface of the box to reduce handling. Prior containers have failed to address these ergonomic-related issues.

Substrate boxes have to be cleaned out after each use so that substrates to be placed in the container in the future do not get contaminated from the prior use. After each container is cleaned, it is typically allowed to air dry, which presents the possibility of liquid being trapped in various areas of the substrate container. Liquid that remains in the substrate container after cleaning can pose many problems including the eroding of the container, potential liquid damage to the substrate once placed in the container and the water trapping contaminates in the container thereby potentially damaging substrates. Prior systems have failed to provide a container to accommodate for those problems, and therefore there is a need for a substrate container that is constructed such that no water is trapped in the container.

Typically substrate containers require an area to provide for removable information or identification pertaining the substrates contained inside. Prior containers have used flexible vinyl sleeves which requires two hand operation and which does not permit for easy replacement. There is a need for a container which provides for easy replacement of information or identification.

Further, the inner surface of the substrate container must be composed of a material that does not contaminate the container or the substrate stored in the container, while also providing electrostatic discharge protection. A commonly used material for this is carbon loaded polyetheretherketone (PEEK) which has a low water absorption rate, high tensile strength, low coefficient of thermal expansion and high heat distortion rate, all of which make it a good polymer to interact with substrates. Yet, PEEK is an expensive material, therefore there is a need to create a container that uses PEEK minimally.

The present invention provides a solution to these and other problems, and offers other advantages over the prior art.

SUMMARY OF THE INVENTION

In accordance with one embodiment of the invention, a substrate transport container is provided. The substrate transport container of the present invention includes a container and a cover. The container includes an open top portion and a closed bottom portion, the top portion having a perimeter greater than the middle portion, and the bottom portion having a perimeter greater than the top portion of the container. The cover is attached to container by way of a snap lock hinge, which is easily detachable and is durable. The cover is secured to the container by way of a link and toggle latch. The cover further includes a carrier, which is used for transporting information pertaining to the substrate and further provides additional balance when the container is in the open position.

The interior of the container includes insert members. The insert includes outer and inner guide rails, compound slanted guides, recessed buttons and catch knobs. The rails are open at the top to provide an easy guide when placing the substrate in the container. The rails then narrow, and along with the compound slanted guides, provide a design that securely holds the substrate in place. The insert is angled such that the substrate will only contact the insert minimally at the outer rim of the substrate.

The container and insert of the substrate transport container are molded together by a two-shot molding process or an overmold process. This process entails first molding the insert. Next, the insert is positioned into a core mold to have the container molded around it. The combination of the core mold and the design of insert allow container to capture the insert and securely hold it in place. Two aspects of the design of the insert that allows for the insert to be securely molded with the container are the catch knobs and recessed buttons. With the core mold in place, the material used to mold the container is formed around the core mold and the insert. The material used for the container flows into the recessed buttons, around the catch knobs and along a portion of the edges of the planar portion and angled portion, while simultaneously forming the container. As the material cools, it captures the insert into the newly formed container, thereby creating an overlap mechanical bond which seals and secures it in place. The material used for the insert is preferably any polymer based material that is abrasion resistant and provides electrostatic discharge protection and the container is preferably any polymer based material that is of a tough impact resistant nature and provides electrostatic discharge protection.

The present invention is designed to address ergonomic-related issues. The present invention incorporates a design with reduced moment and weight, an ergonomically suitable grip style and grip width, all of which reduced the amount of physical stress on the intended user. The design of the box further addresses ergonomic issues by providing rounded edges on the substrate container, guide rails within the container for ease of loading substrates, an easy to open latch on the container, easily identifiable labeling on the outer surface of the box to reduce handling and providing a design that lessens the possibility of stacking each of the substrate containers.

These and various other features as well as advantages which characterize the present invention will be apparent upon reading of the following detailed description and review of the associated drawings.

DETAILED DESCRIPTION

Figure 1:
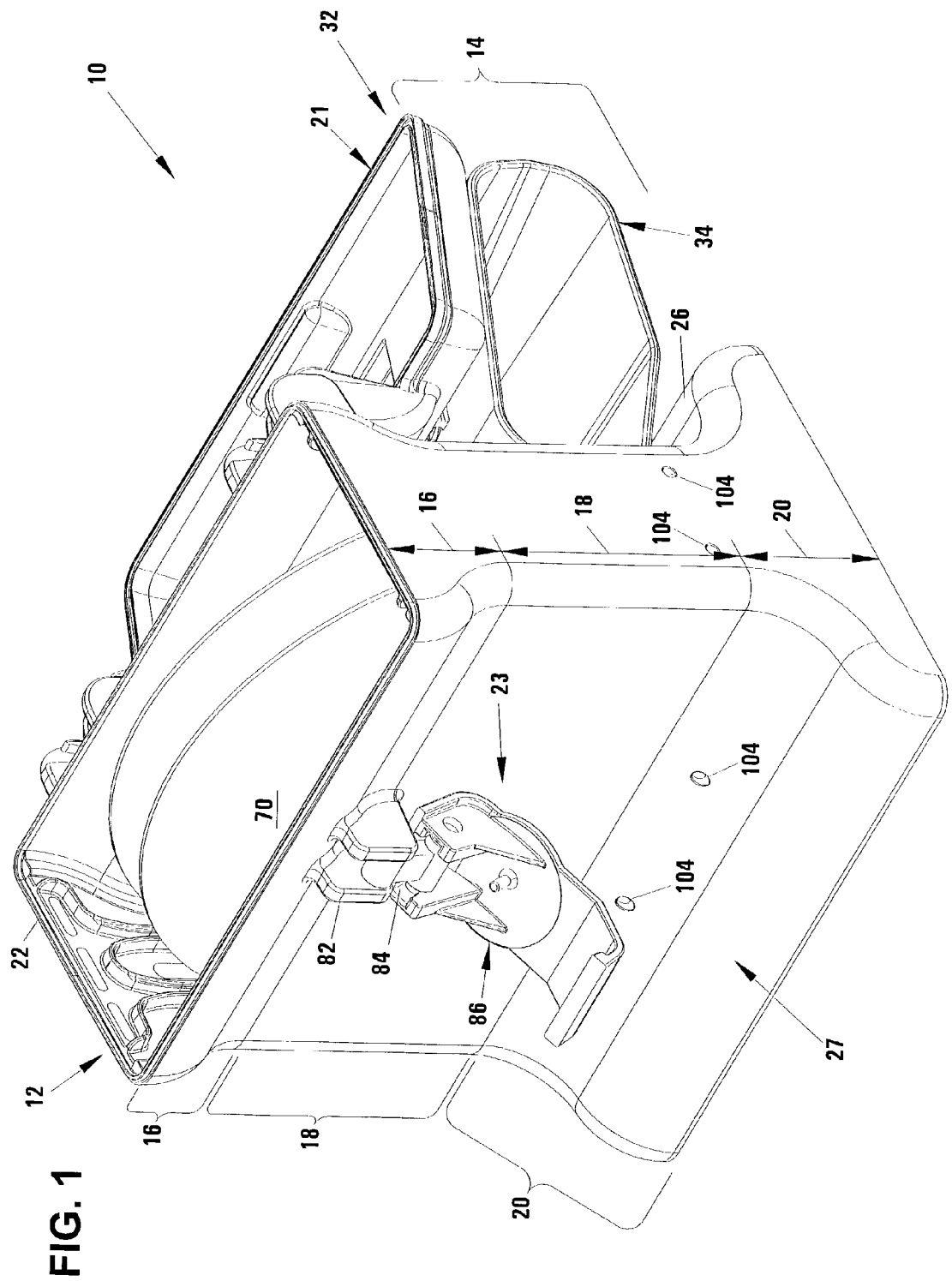
FIG. 1 is a front side elevational view of substrate transport container of the present invention.

An embodiment of the present invention is shown in FIG. 1 and described herein. Substrate container and transport device 10 includes container 12 and a cover 14. Container 12 is connected to cover 14 by a snap lock hinge 24 and link and toggle latch 23, which is more fully shown in FIGS. 8 and 9. Container 12 also includes front wall 27, back wall 26, open top portion 16, middle portion 18 and bottom portion 20. The bottom portion 20 should generally have a larger perimeter than the top portion 16, and the top portion 16 should generally have a larger perimeter than the middle portion 18. Therefore, the open top portion 16 and bottom portion 20 of front wall 27 generally form an ogee curve. Similarly, the open top portion 16 and bottom portion 20 of back wall 26 generally form an ogee curve. One advantage of this design over prior systems is improved balance which guards from substrate container 10 being easily tipped over. This design also addresses ergonomic concerns in the substrate container industry by providing a narrowed middle portion 18. The narrowed middle portion 18 provides a pinch grip style that affords carrying the box without deviated wrist postures. The grip width and grip height of middle portion 18 also adhere to the anticipated user population, while still providing metrics within ergonomic standards. The narrowing of the middle portion 18 also allows the top portion to rest on the thumb and index finger, which reduces grip force. By way of example, the present invention may be designed to allow for a grip width of approximately 2 inches and a grip height of approximately 4 inches, in order to provide an ergonomically correct substrate transport container 10. Those skilled in the art will appreciate that certain dimensions of substrate container 10 may be changed without deviating from the present invention.

Figure 2:
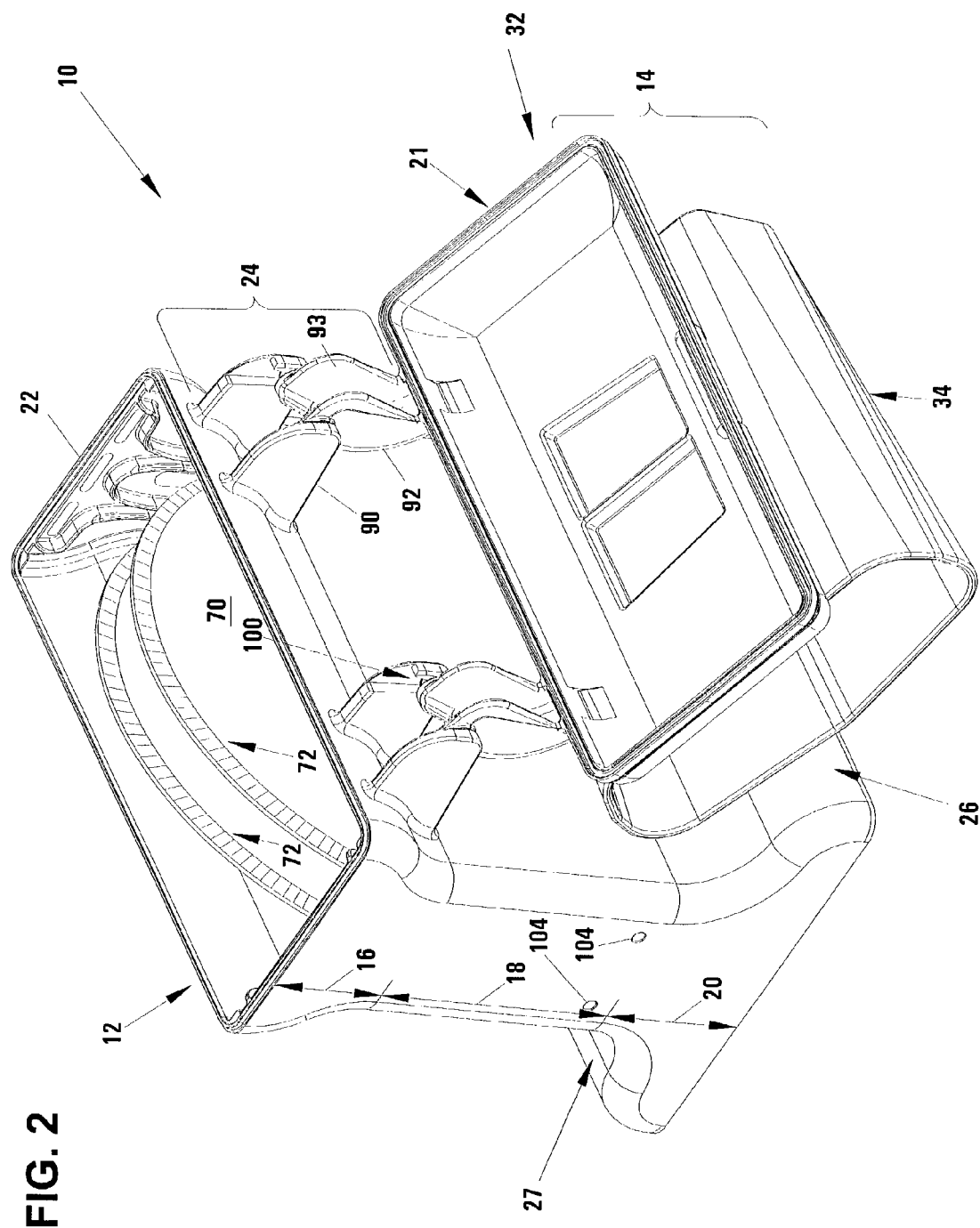
FIG. 2 is a back side elevational view of the container of the type shown in FIG. 1.
Figure 3:
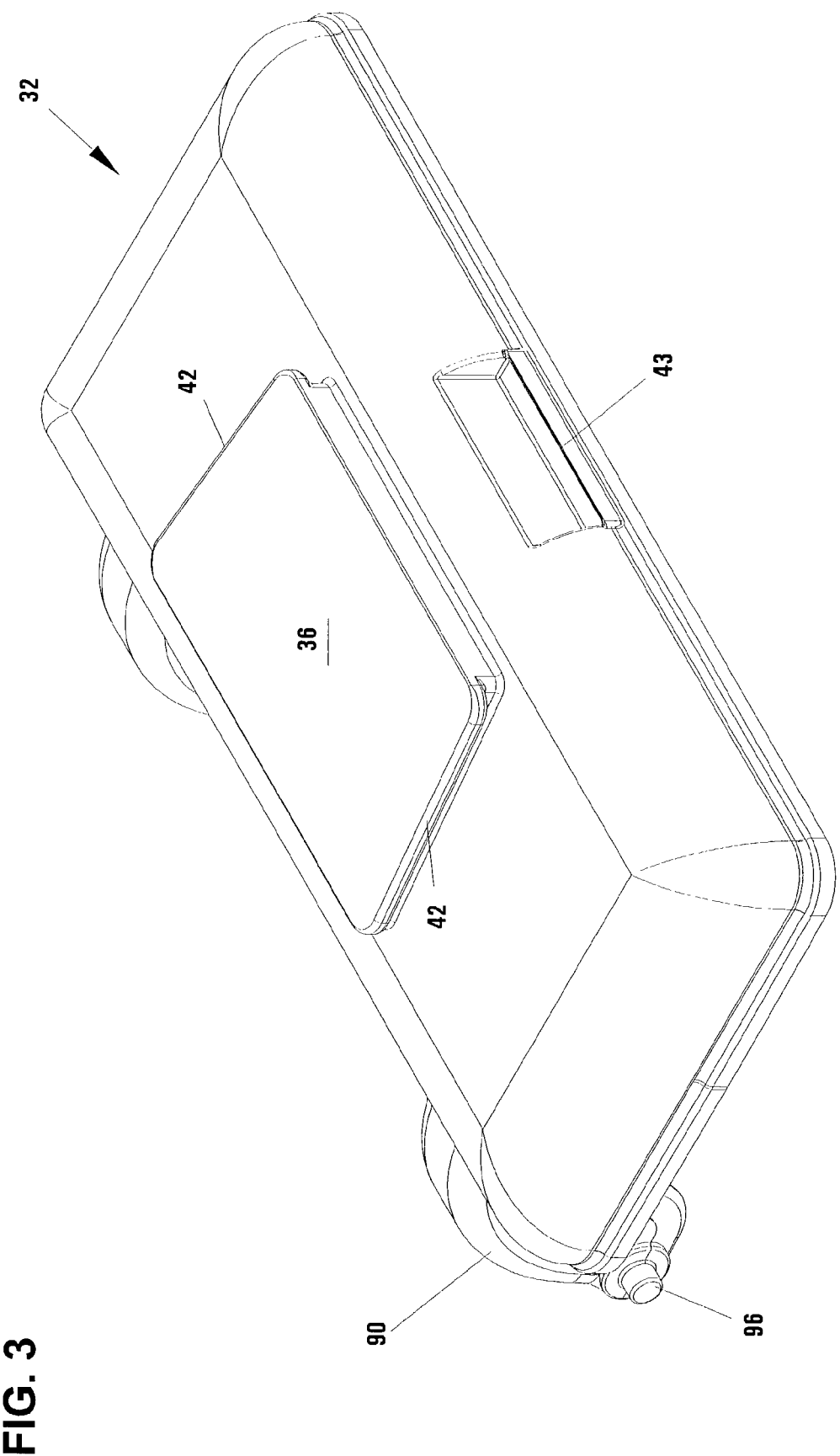
FIG. 3 is a side elevational view of the lid for the container of the type shown in FIG. 1.
Figure 4:
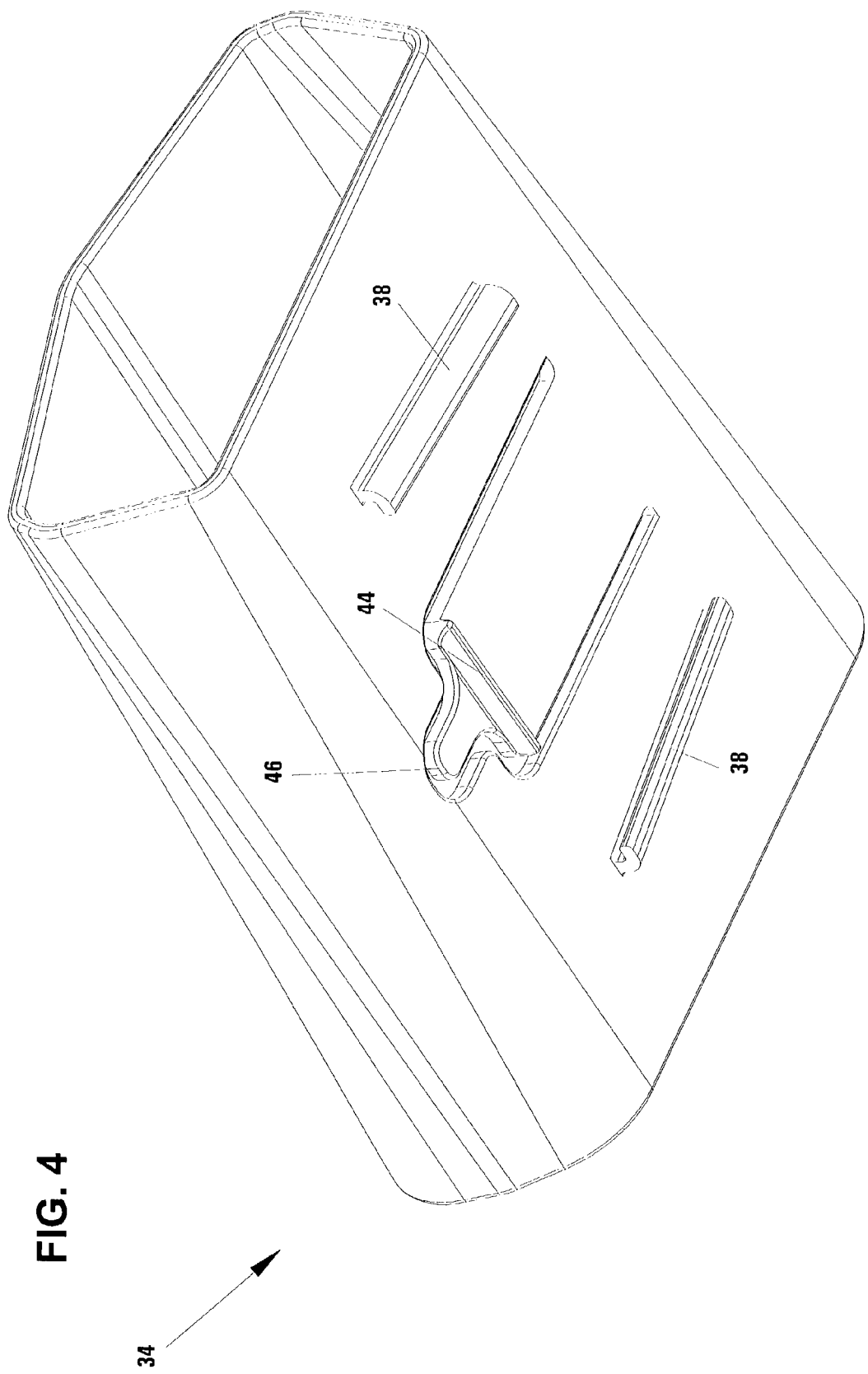
FIG. 4 is a bottom view of the carrier for the container of the type shown in FIG. 1.

The cover 14 includes a lid 32 and carrier 34. As shown in FIGS. 2, 3 and 4, lid 32 has a connecting means 36, which provides a means for carrier 34 to be attached and detached from lid 32. Lid 32 also includes recessed portion 43, which provides an area for link and toggle latch 23 to latch onto and secure lid 32 to container 12. Connecting means 36 includes two sides 42 which are lipped on the top portion and angled thereby giving connecting means 36 a substantially trapezoidal shape. In order for carrier 34 to be easily attached and detached to the connecting means 36, the bottom of carrier 34 includes guide rails 38, stop pawl 44, and tab 46. When attaching carrier 34 to lid 32, the portion of guide rails 38 that are angled out should be lined up with the portion of sides 42 which are angled in. When sliding carrier 34 onto connecting means 36, stop pawl 44 will contact a portion of connecting means 36 and is pushed upward. Once the guide rails 38 are slid to the end of sides 42, the stop pawl 44 will force itself back down and securely connect to an end portion of the connecting means 36. If carrier 34 is desired to be taken off, then tab 46 is pushed up, thereby detaching stop pawl 44 from the end portion of the connecting means 36. Carrier 34 is then able to easily slide off of connecting means 36.

Carrier 34 functions as a means to contain printed hardcopy information pertaining to the contents of the substrate transport container 10. As shown in FIG. 4, carrier 34 has a rounded pentagonal shape, having a rigid "always open" end, which tapers sufficiently to hold 1 to 30 pages of information. This design securely holds the information when the substrate container 10 is in the open or closed position and is "always open" to provide the user an unobstructed access. Also, carrier 34 provides substrate container 10 additional stability when substrate container 10 is in the open position.

To more fully secure the contents of substrate container 10 from contamination, lid 32 includes a convoluted lip 21 and container 12 includes convoluted mating edge 22. When lid 32 is positioned on container 12, convoluted mating edge 22 mates with lip 21 providing an overlapping joint and additional protection from contamination.

Figure 5:
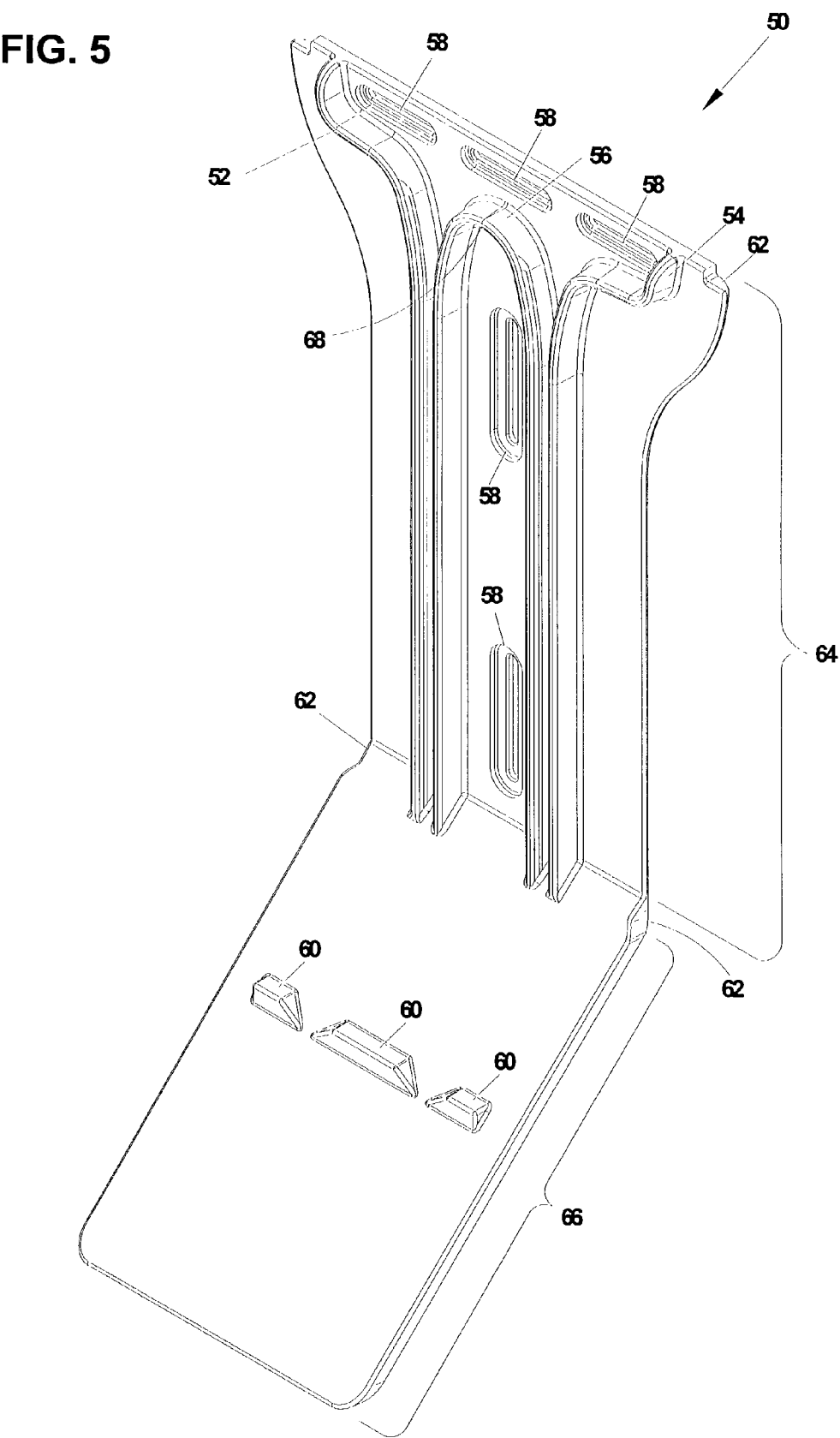
FIG. 5 is an angled front perspective of the substrate insert of the present invention.
Figure 6:
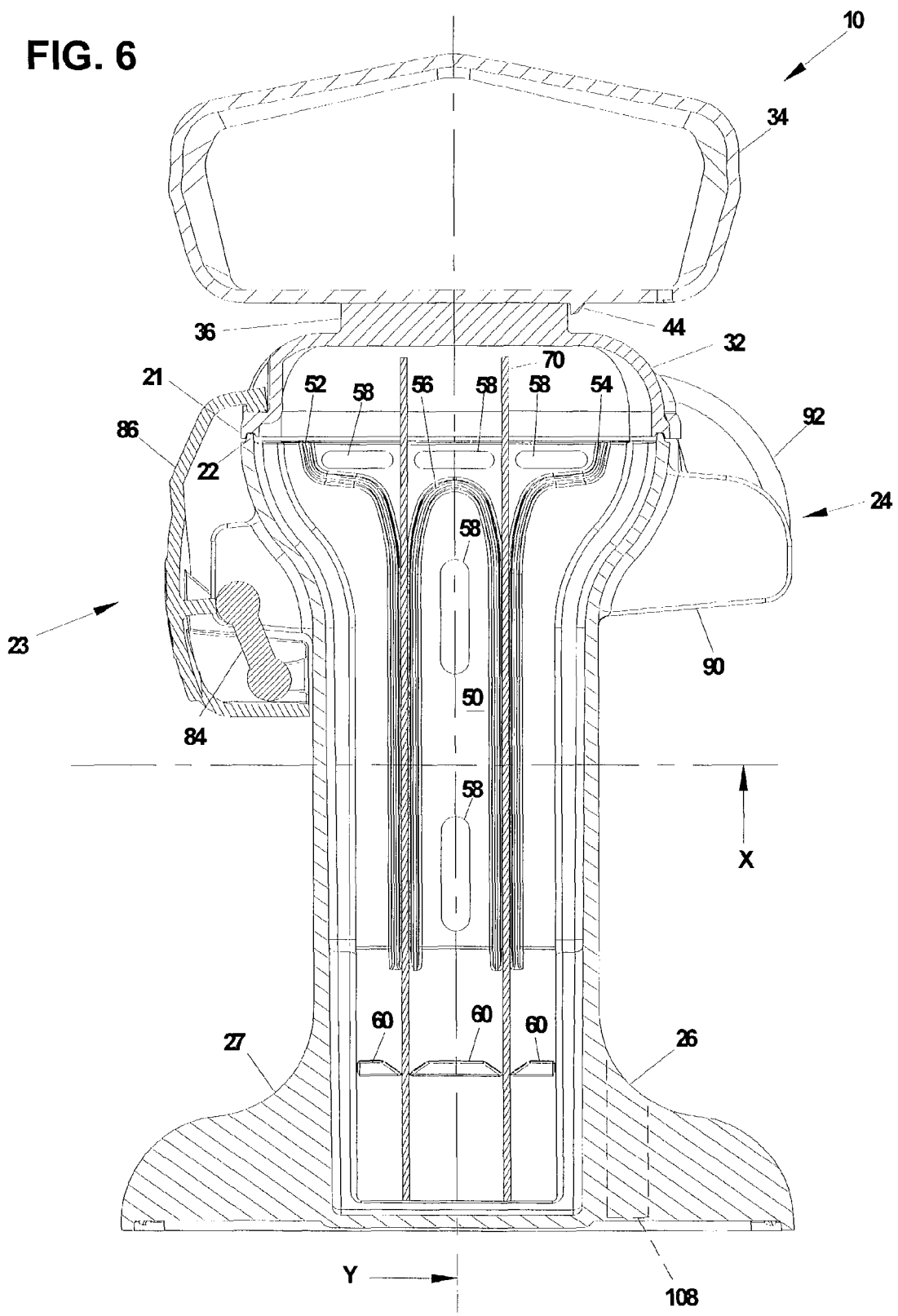
FIG. 6 is a cross sectional view of the container of the type shown in FIG. 1.

Another aspect of the present invention is insert 50, which is fully shown in FIGS. 5 and 6. Insert 50 includes first 52 and second 54 outer rail, inner rail 56, recessed buttons 58, compound slanted guides 60 and catch knobs 62. Insert 50 also includes a planar portion 64 and an angled portion 66. A front view of insert 50 in container 12 is shown in FIG. 6. Container 12 and insert 50 are molded together by a two-shot molding process or an overmold process. This process entails first molding insert 50. Next, insert 50 is positioned into a core mold to have container 12 molded around it. The combination of the core mold and the design of insert 50 allow container 12 to capture the insert 50 and securely hold it in place. Two aspects of the design of insert 50 that allows for insert 50 to be securely molded with container 12 are the catch knobs 62 and recessed buttons 58. With the core mold in place, the material used to mold the container 12 is formed around the core mold and insert 50. The material used for container 12 flows into recessed buttons 58, around catch knobs 62 and along a portion of the edges of planar portion 64 and angled portion 66, while simultaneously forming container 12. As the material cools, it captures insert 50 into the newly formed container 12, thereby creating an overlap mechanical bond which seals and secures it in place. As FIGS. 5 and 6 illustrate, recessed button 58 embodies an oblong oval shape, yet those skilled in the art will recognize that various shapes may be used for recessed button 58 without departing from the present invention. The two-shot molding process is advantageous over prior systems because it provides a secure fit between materials thereby incorporating the advantages of each material along with reducing contamination risk and provides less parts for an operator to handle or clean. The material used for insert 50 is preferably any polymer based material that is abrasion resistant and provides electrostatic discharge protection and container 12 is preferably any polymer based material that is of a tough impact resistant nature and provides electrostatic discharge protection. By way of example, the material used for insert 50 can be carbon loaded polyetheretherketone (PEEK) and for container 12 can be carbon loaded polyproplyne. This process is also advantageous over prior systems because it allows the use of multiple materials for one container. One skilled in the art will appreciate that other similar processes and materials may be used to combine insert 50 and container 12 without departing from the present invention.

Figure 7:
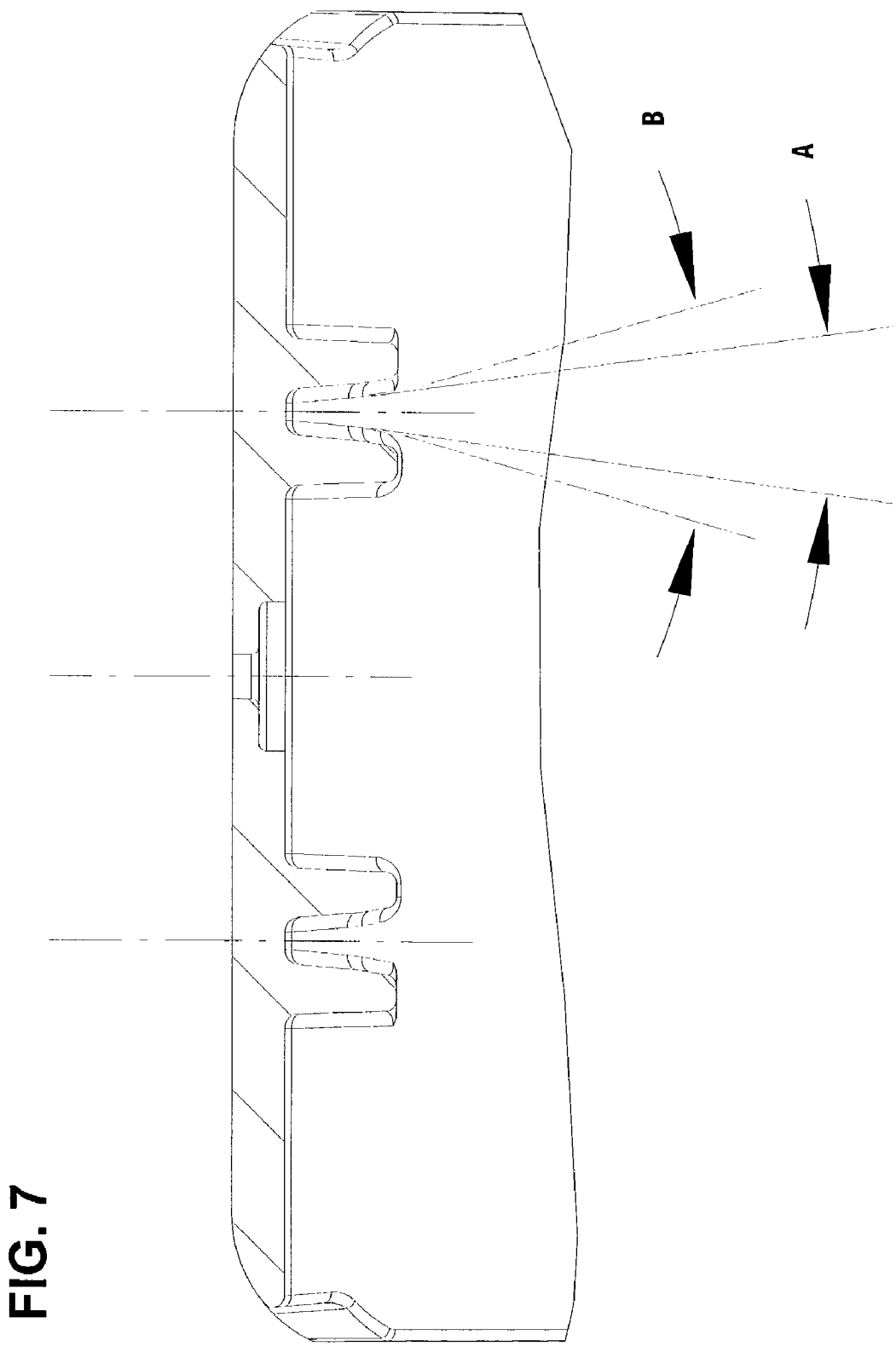
FIG. 7 is a top cross sectional view of the insert of the type shown in FIG. 5.

The design of insert 50 is advantageous for interaction with a substrate for numerous reasons. First 52 and second 54 outer rail and inner rail 56 incorporates a ramped lead-in design on the top section of the planer portion 64, of insert 50. This ramped design allows for the intended user of substrate transport device 10 to easily place a substrate into container 12. If the intended user inaccurately places a substrate into container 12, rails 52, 54, 56 and compound slanted guides 60 will easily direct the substrate into the container 12. This also reduces the potential for cross-slotting a substrate or of the substrate contacting a portion of the container 12 other than insert 50, which lessens the risk of contamination. Even if the cross-slotting of a substrate occurs, the design of insert 50 ensures that the substrate will only contact insert 50, which prevents the risk of contamination. Further, as shown in FIG. 1, each substrate includes an outer rim exclusion zone 72, where no information or critical material is placed. As shown in FIGS. 5 and 6, rails 52, 54 and 56 narrow so that the rails only contact the substrates outer rim, thereby prevent jostling or movement during transport and not damaging the critical area of the substrate. Rails 52, 54 and 56 also include compound bevels A and B, as shown in FIG. 7, wherein the included angle B is greater than A. Included angle A of the rail secures the substrate by capturing the outer rim 72, while angle B of the rail provides additional guidance so the likelihood of damage to an incorrectly inserted substrate is reduced. Insert 50 also includes tapered portion 68 of inner rail 56, which is designed such that when insert 50 (or container 12) is overturned during the cleaning process, liquid that contacts that the insert 50 will not be trapped in the area surrounding the lipped portion 68 of inner rail 56. This feature reduces the potential of introducing contaminates to the substrate container 10 and a substrate stored in substrate container 10.

Substrate container 10 also addresses ergonomic issues by being substantially symmetric and providing a strategically placed center of mass. FIG. 6 includes axis x and axis y, wherein each axis show that substrate container 10 is substantially symmetric and has a center of mass that falls in the grip space (middle portion 18). The center of mass is defined as where axis x intersects with axis y. Since the center of mass falls within the grip space and substrate container 10 is symmetric, movement and grip force is reduced, which lessens the stress put on the intended user.

Figure 8:
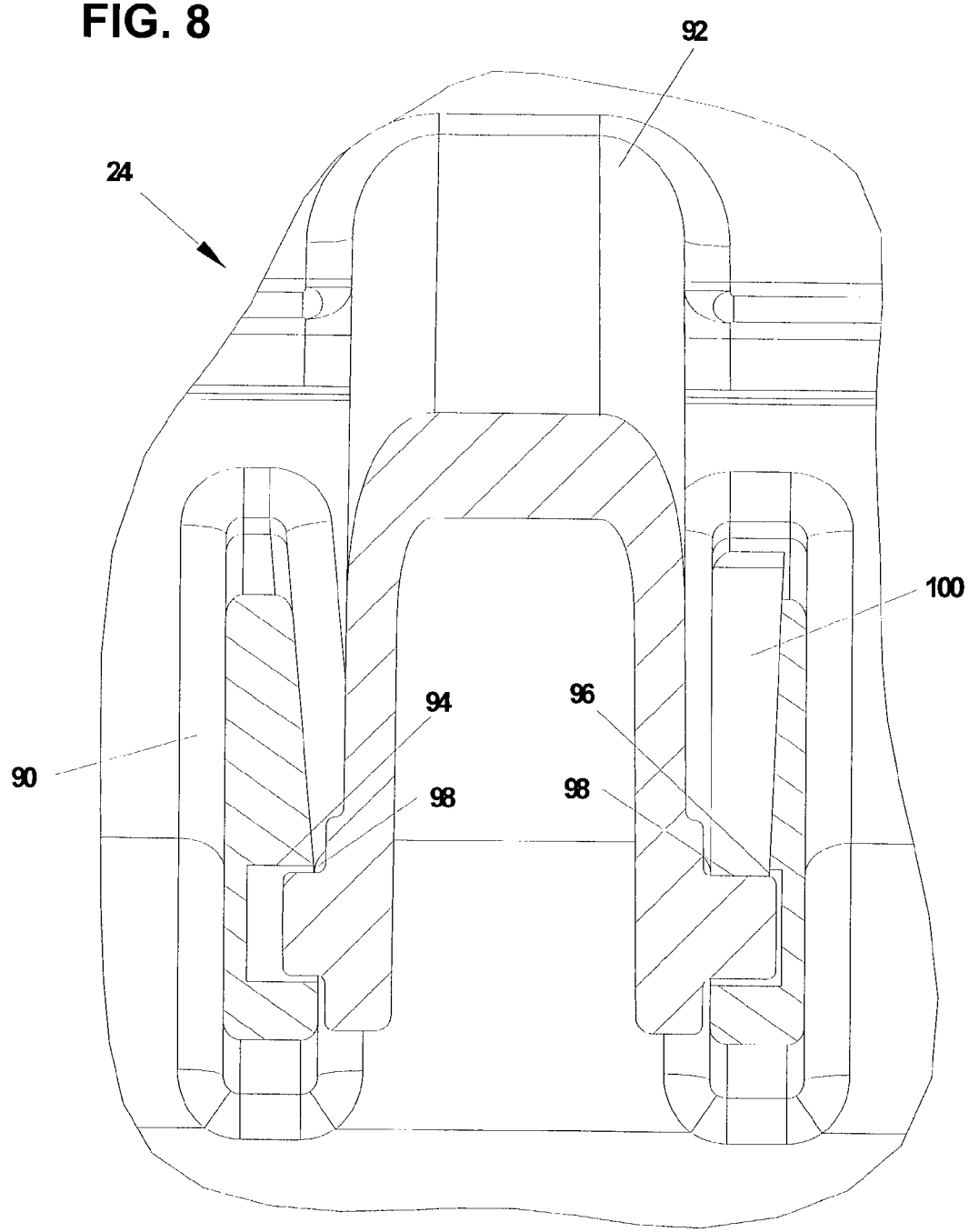
FIG. 8 is a cross sectional perspective view of the snap lock hinge of the container of the type shown in FIG. 1.

FIG. 8 is a cross sectional view of snap lock hinge 24, which is also shown in FIGS. 2 and 6. Snap lock hinge 24 includes stationary member 90 and moving member 92. Moving member 92 includes bosses 98, which are formed on an end portion of moving member 92. Stationary member 90 includes two locking receivers 94 and 96, which provides an area for bosses 98 to lock moving member 92 into place. Locking receiver 94 provides an area for bosses 98 to fully lock into place. To provide ease of attaching and detaching lid 32 from container 12, a guide area 100 is provided to correctly position boss 98 into locking receiver 96. Locking receiver 96 only partially encompasses boss 98, which allows the intended user to easily unlock lid 32 from stationary member 90 simply by compressing ears 93 (shown in FIG. 2) on moving member 92. Including guide area 100 only on one side of stationary member 90 allows for easy removal of lid 32 and a secure fit.

Figure 9:
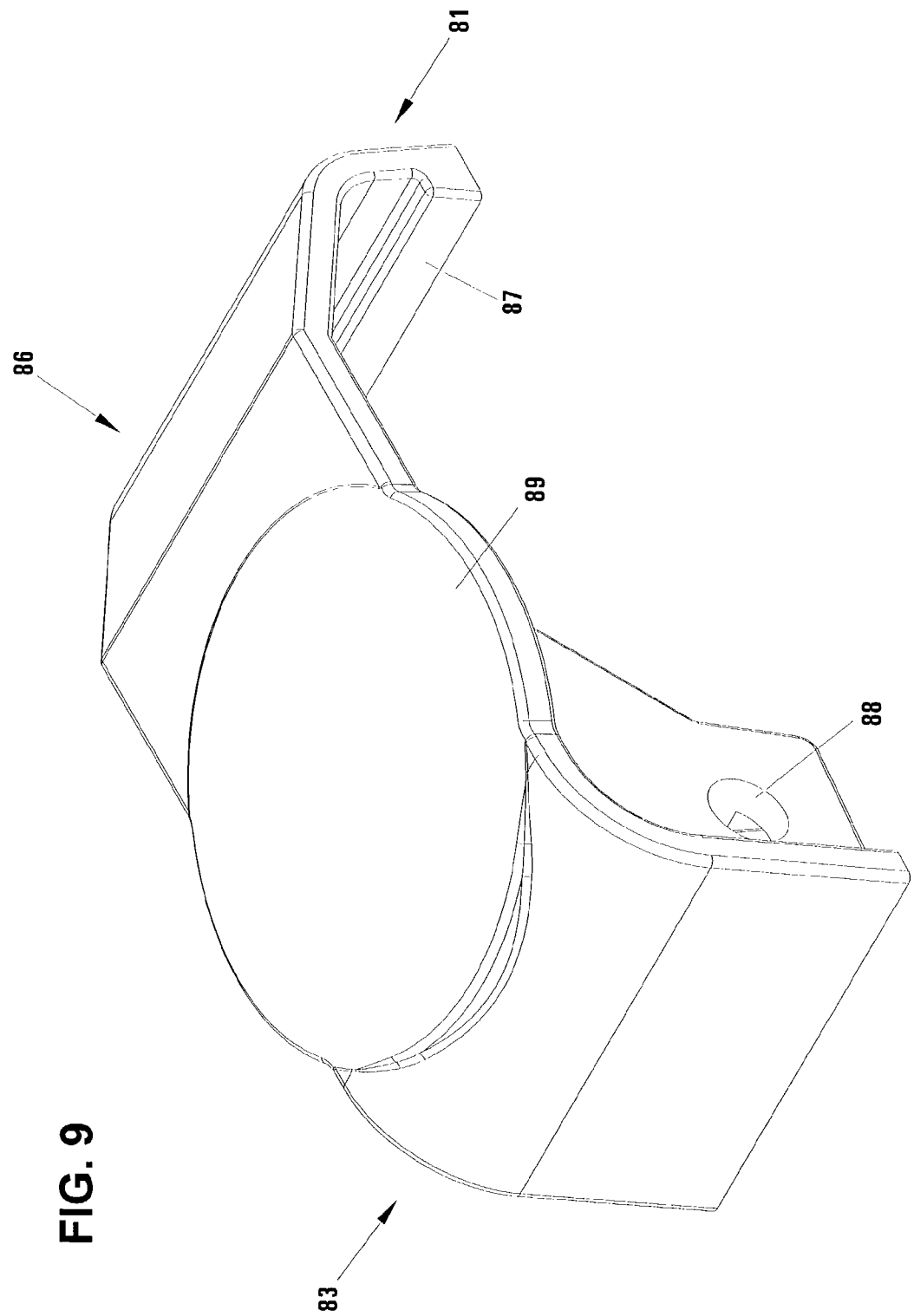
FIG. 9 is a perspective view of the latch of the container of the type shown in FIG. 2.

FIG. 9 is a perspective view of latch 86, which is also shown in FIGS. 1 and 6. Link and toggle latch 23 includes contact piece 82, connecting link 84, latch 86, beveled portion 87, apertures 88 and disk grasp 89. Connecting link 84 freely connects contact piece 82 and latch 86, thereby allowing latch 86 to pivotally move. Connecting link 84 includes bosses which securely fit into the apertures 88 of latch 86 and contact piece 82. The link and toggle latch 23 addresses ergonomic issues through ease of use and through the inclusion of the apparent disk grasp 89. To operate link and toggle latch 23, simply position the distal end 81 of latch 86 into the recessed portion 43 of lid 32. Distal end 81 includes beveled portion 87 so that the distal end 81 is securely captured in recessed portion 43. A minimal amount of force should be applied to the proximate end 83 of latch 86 to push latch 86 towards container 12. Once the proximate end 83 is toggled over center the spring force of link and toggle latch 23 securely retains link and toggle latch 23 in place. To open, a minimal amount of force should be applied to the proximate end 83 of latch 86 to release latch 86 over center, away from container 12 to disconnect latch 86 from lid 32. The minimal amount of force needed to open and close link and toggle latch 23 addresses ergonomic issues by providing a locking mechanism that is easy to use and requires a minimal amount of force to operate. Further, because link and toggle latch provides an apparent disk grasp 89, the intended user will likely open substrate transport container 10 via link and toggle latch 23, thereby reducing the risk of the intended user exerting force on other areas of the container.

Figure 10:
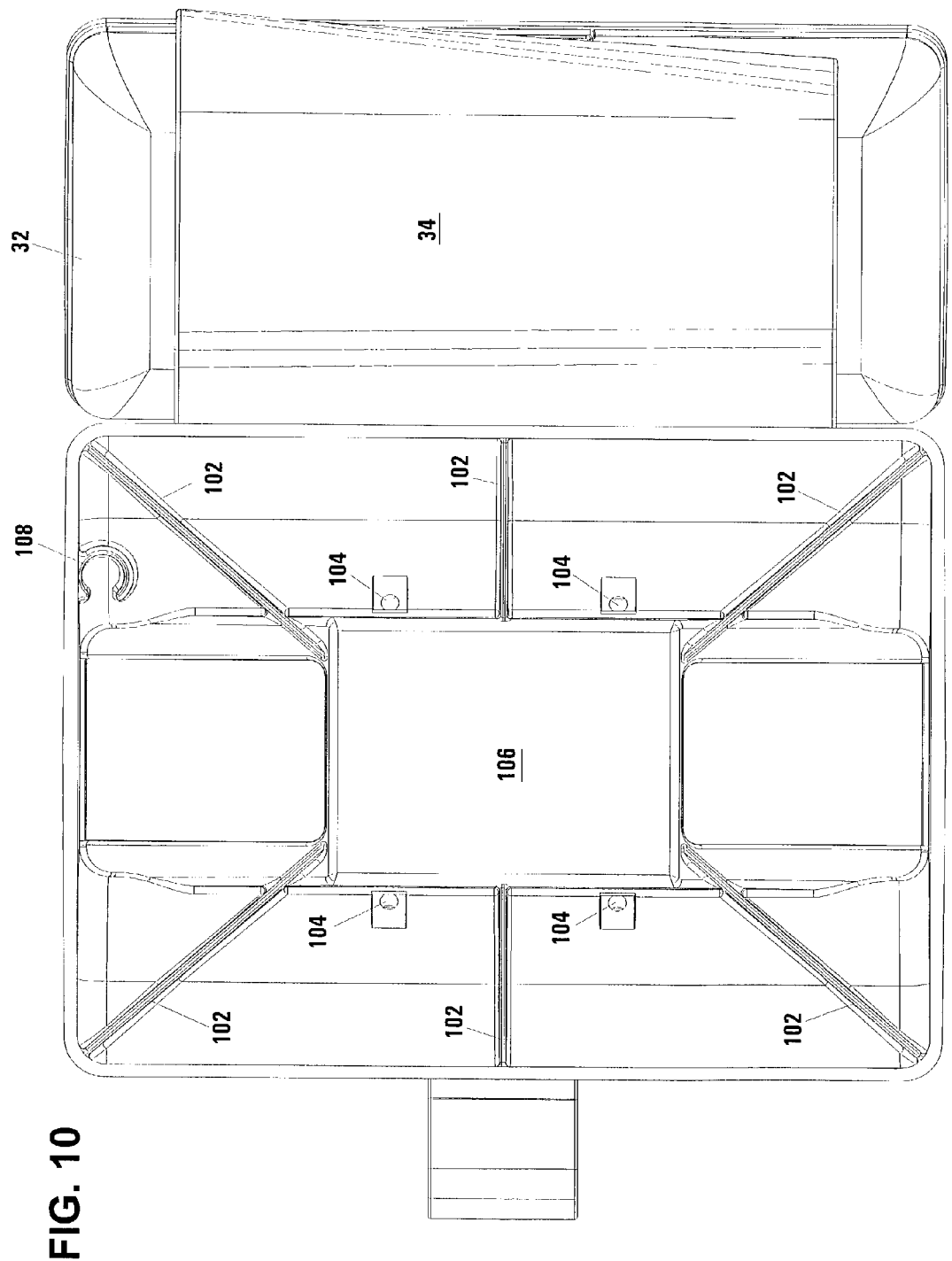
FIG. 10 is a bottom view of the container of the type shown in FIG. 1.

FIG. 10 is a bottom view of substrate transport container 10, more fully showing the bottom of bottom portion 20. The bottom of container 12 includes stabilizing webs 102, drain holes 104, a center base portion 106 and radio frequency (RF) tag receptacle 108. Stabilizing webs 102 connect center base portion 106 to the walls of container 12. The use of stabilizing webs 102 allows for stability when substrate transport container 10 is put on wired shelving, and also adds strength while reducing the amount of material. The reduction in amount of material and thereby lessens the overall weight of the substrate transport container 10 which reduces the amount of grip force needed to operate substrate transport container 10. Drain holes 104 are provided (also shown in FIGS. 1 and 2), which lessens the risk of contamination by reducing the amount of fluid retention after cleaning of substrate transport container 10. RF tag receptacle is juxtaposed to the inside wall of bottom portion 20, positioned within read distance of the reading device. The RF tag receptacle 108 forms a slotted cylinder positioned just below flush of the base plane descending to the inside back wall 26. The design of FR tag receptacle 108 provides an advantage over prior designs to capture the RF tag securely and by being slotted to allow fluid to drain freely from the RF tag receptacle 108 into drain hole 104.

Substrate transport container 10 is internally and externally rounded which addresses ergonomic and contaminate issues. The external rounding of the edges of substrate transport container 10 significantly reduces the risk of injuring the user and provides a smooth and comfortable handling area. Further, the internal rounding lessens the risk of liquid and other contaminates to be trapped in the container, which reduces the risk of damaging the substrate.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

We claim:

1. A substrate containment and transport device comprising:
    a container having an open top portion and a closed bottom portion, said open top and closed bottom portion each having a perimeter greater than a perimeter of a middle portion of said container between said top portion and said bottom portion;
    a cover hingedly connected to the open top portion and securable to enclose the open top portion of said container, wherein said container is capable of containing a planar substrate within the container; and
    wherein said container has a cavity formed therein, and an insert having a plurality of slots that are defined by a pair of rails that extend away from an inner surface of the insert, said insert secured to the container within the cavity of said container in a manner to contain the planar substrates between one of said slots;
    and wherein the perimeter of the middle portion of the container defines a portion of the cavity of the container.

2. A substrate containment and transport device of claim 1, wherein the closed bottom portion has a perimeter larger than a perimeter of the open top portion.

3. A substrate containment and transport device of claim 1, wherein said cover includes a detachable carrier to store information pertaining to said substrates, said detachable carrier including a first end and a second end, further wherein said detachable carrier is tapered from said first end to said second end.

4. The substrate containment and transport device of claim 3, wherein said detachable carrier has a rounded pentagonal shape.

5. A substrate containment and transport device of claim 1, wherein said middle portion has a grip height of approximately at least 4 inches and a grip width of approximately at least 2 inches.

6. A substrate containment and transport device of claim 1, wherein said container and said cover are symmetrical and have a center of mass positioned in the middle portion.

7. A substrate containment and transport device of claim 1, wherein the substrates include an outer rim, further wherein said outer rim is the only part of the substrate that contacts said insert.

8. A substrate containment and transport device of claim 1, wherein the insert includes a plurality of recessed buttons, catch knobs and edges, further wherein said insert is secured to the container within the cavity of said container by molded material of the container at least partially surrounding the recessed buttons, catch knobs and edges of the insert, thereby creating a securable mechanical bond between the insert and the container.

9. A substrate containment and transport device of claim 1, wherein the container includes drain holes.

10. A substrate containment and transport device of claim 1, wherein said insert is made of the material carbon loaded polyetheretherketone and said container and cover are made of the material carbon loaded polypropylene.

11. A substrate containment and transport device of claim 1, further including a hinge comprising:
    a moving member including a first side, second side, a distal end and a proximate end, said proximate end connected to the cover and said distal end including a boss on the first and second side of said distal end, wherein a portion of the distal end of the moving member defines a gap between the first and second side of the moving member;
    a stationary member including a first and second arm connected to and extending from said container, said first arm including a first locking receiver recessed into said first arm and said second arm including a second locking receiver recessed into said second arm, said second arm further including a guide area adjacent said second locking receiver; and
    wherein said boss is connected into said first and second locking receiver thereby connecting moving member to said stationary member.

12. A substrate containment and transport device of claim 1, further including a link and toggle latch comprising:
    a latch including a proximal end, distal end, disk grasp and a first and second aperture, wherein said disk grasp is positioned between said proximal and distal end, and said first and second aperture are recessed in said proximal end of said latch;
    a contact piece including a first and second arm, wherein said first and second arm are connected to and extend from said container, further wherein said first and second arm each include an aperture recessed within said first and second arm; and
    a connecting link including a proximal and distal end, wherein said proximal end includes a pair of bosses and said distal end includes a pair of bosses, further wherein said pair of bosses on said proximal end are connected into the aperture of said first and second arm and said pair of bosses on said distal end are connected into the apertures of said latch.

13. A substrate containment and transport device comprising:
    a container having an open top portion, a closed bottom portion, and a middle portion in between the top portion and the bottom portion and having a cavity formed therein, said container includes an insert having a plurality of slots that are defined by a pair of rails that extend away from an inner surface of the insert for containing planar substrates, said insert secured to the container within the cavity of the container;
    a cover hingedly connected to the open top portion and securable to enclose the open top portion of said container, said container contains the planar substrates within the container, wherein the closed bottom portion has a perimeter larger than a perimeter of the open top portion; and
    wherein each of the top portion, middle portion, and bottom portion have a perimeter, the perimeter of the top portion and bottom portion is greater than the perimeter of the middle portion, the perimeter of the middle portion defines a portion of the cavity.

14. A substrate containment and transport device of claim 13, wherein said cover includes a detachable carrier to store information pertaining to said substrates, said detachable carrier including a first end and a second end, further wherein said detachable carrier is tapered from said first end to said second end.

15. The substrate containment and transport device of claim 14, wherein said detachable carrier has a rounded pentagonal shape.

16. A substrate containment and transport device of claim 13, wherein said middle portion has a grip height of approximately at least 4 inches and a grip width of approximately at least 2 inches.

17. A substrate containment and transport device of claim 13, wherein said container and said cover are symmetrical and have a center of mass positioned in the middle portion.

18. A substrate containment and transport device of claim 13, wherein the substrates include an outer rim, further wherein said outer rim is the only part of the substrate that contacts said insert.

19. A substrate containment and transport device of claim 13, wherein the insert includes a plurality of recessed buttons, catch knobs and edges, further wherein said insert is secured to the container within the cavity of said container by molded material of the container at least partially surrounding the recessed buttons, catch knobs and edges of the insert, thereby creating a securable mechanical bond between the insert and the container.

20. A substrate containment and transport device of claim 13, wherein the container includes drain holes.

21. A substrate containment and transport device of claim 13, wherein said insert comprises of a polymer based material that is abrasion resistant and provides electrostatic discharge protection, further wherein said container comprises of a polymer based material that is of a tough impact resistant nature and provides electrostatic discharge protection.

22. A substrate containment and transport device of claim 13, further including a hinge comprising:
a moving member including a first side, second side, a distal end and a proximate end, said proximate end connected to the cover and said distal end including a boss on the first and second side of said distal end, wherein a portion of the distal end of the moving member defines a gap between the first and second side of the moving member;
a stationary member including a first and second arm connected to and extending from said container, said first arm including a first locking receiver recessed into said first arm and said second arm including a second locking receiver recessed into said second arm, said second arm further including a guide area adjacent said second locking receiver; and
wherein said boss is connected into said first and second locking receiver thereby connecting moving member to said stationary member.

23. A substrate containment and transport device of claim 13, further including a link and toggle latch comprising:
a latch including a proximal end, distal end, disk grasp and a first and second aperture, wherein said disk grasp is positioned between said proximal and distal end, and said first and second aperture are recessed in said proximal end of said latch;
a contact piece including a first and second arm, wherein said first and second arm are connected to and extend from said container, further wherein said first and second arm each include an aperture recessed within said first and second arm; and
a connecting link including a proximal and distal end, wherein said proximal end includes a pair of bosses and said distal end includes a pair of bosses, further wherein said pair of bosses on said proximal end are connected into the aperture of said first and second arm and said pair of bosses on said distal end are connected into the apertures of said latch.

24. A substrate containment and transport device comprising:
an insert including a plurality of slots, edges, catch knobs and recessed buttons, said plurality of slots including a plurality of rails and compound slanted guides to securely contain planar substrates;
a container having an open top portion, a closed bottom portion, a middle portion, and having a cavity formed therein, wherein said insert is secured to the container within the cavity of said container by molded material of the container at least partially surrounding the recessed buttons, catch knobs and edges of the insert, thereby creating a securable mechanical bond between the insert and the container;
a cover hingedly connected to the open top portion and securable to enclose the open top portion of said container, said container contains the planar substrates within the container; and
wherein each of the top portion, middle portion, and bottom portion have a perimeter, the perimeter of the top portion and bottom portion is greater than the perimeter of the middle portion, the perimeter of the middle portion defines a portion of the cavity.

25. A substrate containment and transport device of claim 24, wherein the closed bottom portion has a perimeter larger than a perimeter of the open top portion.

26. A substrate containment and transport device of claim 24, wherein said cover includes a detachable carrier to store information pertaining to said substrates.

27. A substrate containment and transport device of claim 24, wherein said middle portion has a grip height of approximately at least 4 inches and a grip width of approximately at least 2 inches.

28. A substrate containment and transport device of claim 24, wherein said container and said cover are symmetrical and have a center of mass positioned in the middle portion.

29. A substrate containment and transport device of claim 24, wherein the substrates include an outer rim, further wherein said outer rim is the only part of the substrate that contacts said insert.

30. A substrate containment and transport device of claim 24, wherein the container includes drain holes.

31. A substrate containment and transport device of claim 24, wherein said insert is made of the material carbon loaded polyetheretherketone and said container and cover are made of the material carbon loaded polypropylene.

32. A substrate containment and transport device of claim 24, wherein said bottom portion of said container includes an inside wall, further wherein a radio frequency tag receptacle is adjacent the inside wall.

33. A substrate containment and transport device of claim 24, further including a hinge comprising:
a moving member including a first side, second side, a distal end and a proximate end, said proximate end connected to the cover and said distal end including a boss on the first and second side of said distal end, wherein a portion of the distal end of the moving member defines a gap between the first and second side of the moving member;
a stationary member including a first and second arm connected to and extending from said container, said first arm including a first locking receiver recessed into said first arm and said second arm including a second locking receiver recessed into said second arm, said second arm further including a guide area adjacent said second locking receiver; and wherein said boss is connected into said first and second locking receiver thereby connecting moving member to said stationary member.

34. A substrate containment and transport device of claim 24, further including a link and toggle latch comprising:

a latch including a proximal end, distal end, disk grasp and a first and second aperture, wherein said disk grasp is positioned between said proximal and distal end, and said first and second aperture are recessed in said proximal end of said latch;

a contact piece including a first and second arm, wherein said first and second arm are connected to and extend from said container, further wherein said first and second arm each include an aperture recessed within said first and second arm; and a connecting link including a proximal and distal end, wherein said proximal end includes a pair of bosses and said distal end includes a pair of bosses, further wherein said pair of bosses on said proximal end are connected into the aperture of said first and second arm and said pair of bosses on said distal end are connected into the apertures of said latch.

\* \* \* \* \*